July 6, 1948.　　　　E. J. BAUMGARDNER　　　　2,444,888
COUPLING
Filed Dec. 12, 1944

INVENTOR.
EARL J. BAUMGARDNER
BY
Charles S. Penfold
ATTORNEY

Patented July 6, 1948

2,444,888

UNITED STATES PATENT OFFICE 2,444,888

COUPLING

Earl J. Baumgardner, Marion, Iowa, assignor to H. A. Douglas Mfg. Co., Bronson, Mich., a corporation of Michigan Application December 12, 1944, Serial No. 567,813

17 Claims. (Cl. 285—173)

This invention relates generally to coupling devices and more particularly is directed to a fitting or plug device, secured to the extremity of a conduit, such as the conduit of a vacuum cleaner, whereby the hose may be detachably connected to the cleaner.

One important object of the invention is to provide a fitting which will allow the conduit or hose to rotate freely with respect to the fitting when the latter is connected to the cleaner. This arrangement has proven desirable because twisting, coiling, and kinking of the conduit is prevented when an accessory such as a floor nozzle, connected to the opposite end of the conduit is being used.

Another object is to provide a fitting which consists of very few parts which may be easily and quickly assembled into a compact unit on a production basis.

A further object is to provide a fitting which may be easily and quickly detachably connected to the cleaner in a manner whereby the air passing through the conduit will not escape through the fitting; in other words, an uninterrupted continuous passage is provided between the conduit and the interior of the cleaner.

A still further object is to provide a fitting or plug which may rotate with respect to the cleaner and the conduit may rotate with respect to the plug.

Other objects and advantages of the invention will be apparent after reading the description hereinafter set forth in connection with the drawing annexed hereto.

Figure 1:
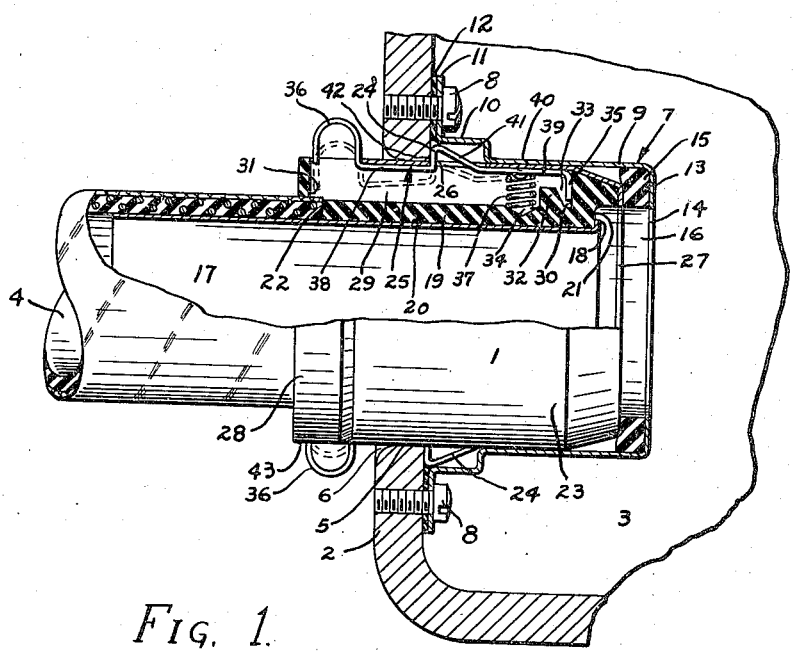
Figure 1 shows the conduit fitting secured or assembled with a vacuum cleaner, with portions of the assembly broken away to clearly illustrate the details of construction.

Referring more in detail to the structure illustrated in Figure 1, numeral 1 represents the fitting or plug detachably connected to the end wall 2 of a vacuum cleaner housing 3, and 4 is the conduit or hose rotatably associated with the fitting.

The end wall of the vacuum cleaner housing is provided with a circular opening 5 through which the fitting is projected. The opening is preferably chamfered at 6 whereby to assist in piloting the plug into the opening. A receptacle or socket 7 for the plug is secured to the inner side of the end wall 2 by a plurality of screws 8. The receptacle includes, a cylindrical portion 9 serving as a bearing or support for a part of the plug, an enlarged annular portion 10 which forms a space within which portions of the latches may operate, and a radially extending flange 11. A gasket 12 is disposed between the flange 11 and the inner side of the end wall of the cleaner so as to seal off and prevent any air from being drawn into the cleaner other than through the passage desired. The receptacle 7 is also provided with an end wall 13 provided with an aperture 14. A resilient washer 15 is disposed in the receptacle 7 and preferably cemented to the end wall 13 to serve as a yieldable abutment for the inner end or extremity of the plug. The washer 15 is provided with an aperture 16 corresponding to the aperture 14.

The conduit is of conventional construction. One extremity of an elongated tube 17 is firmly secured against rotation in the conduit 4 and its other extremity extends beyond the end of the conduit and provides a fixed mounting or support about which the plug 1 may rotate. The free end of the tube 17 is preferably provided with a radial locking flange 18.

The plug preferably includes a tubular cylindrical body 19 constructed from some desirable material, such as pyroxylin plastic or phenolic condensate. The body is provided with a round opening 20 through which the tube 17 extends whereby to rotatably mount the plug. The end of the body which first enters the receptacle 7 of the cleaner is preferably recessed to provide a shoulder 21 which is engaged by the radial flange 18 of the tube for holding the plug connected to the conduit. The opposite or trailing end of the body is also preferably recessed to provide a shoulder 22 which is engaged by the end of the conduit whereby to hold the plug against movement in an axial direction. The end of the conduit being seated in the last mentioned recess is well protected and serves to conceal any end which may not have been cut or severed as intended. Also, any frayed ends of the fabric covering on the conduit are concealed from view.

A cup shaped ferrule 23 snugly surrounds the body 19 and is detachably connected thereto by the catch portions 24 of the latches 25, the catch portions 24 projecting through square shaped openings 26 provided therefor in the ferrule. Thus, it will be evident that the intervening space between the tube and ferrule is completely filled or taken up by the body 19. The bottom or end wall of the cup shaped ferrule abuts the extreme end of the body and is provided with an aperture 27 corresponding in size to the apertures 14 and 16 in the receptacle or socket and washer 15. The entrance end of the ferrule is preferably tapered to assist in piloting the plug into the chamfered opening 6 of the cleaner and into the receptacle 7. The ferrule is of a length somewhat less than the length of the body 19 and terminates more or less against an exposed enlargement 28 of the body which more or less serves as a handle to assist in connecting and disconnecting the plug with respect to the cleaner.

The body 19 is further provided with a pair of diametrically disposed longitudinally extending shallow channels or pockets 29, generally rectangular in cross section. The end wall 30 of each channel terminates short of the entrance end of the plug and its other end 31 terminates in the enlargement or handle portion 28 of the plug. The bottom wall of the channel is provided with an upstanding lug 32 spaced from the end wall 30 to provide a recess 33. The bottom wall is also provided with a round depression 34 adjacent the lug 32.

A resilient latch 25 is disposed in each of the channels 29. One end of each latch is provided with a laterally bent tongue 35 which is caught in the recess 33 and its opposite end is provided with a rounded loop portion 36 which projects outwardly with reference to the handle portion 28 of the body to provide finger operated latch means. The end of the loop or finger portion 36 and tongue 35 are adapted to more or less engage the end walls of the channel so as to prevent longitudinal movement of the latch in the channel. A helical spring 37 is preferably disposed in each of the channels at a desirable location. One end of each spring is seated in the depression 34 and its opposite end engages the latch at a point intermediate the lateral tongue 35 and the catch portion 24 to yieldingly press the aligned planar portions 38 and 39 on either side of the catch against the inner curved surface of the ferrule 23 and thereby predetermine the position of the catch portion 24 and the finger portion 36 exteriorly of the general confines of the plug. A small boss 40 is provided on each latch so as to assist in holding the spring 37 in place. The lug 32 also serves to hold the spring in position. The catch portion of each latch includes a cam portion 41 and a shoulder portion 42.

Figure 4:
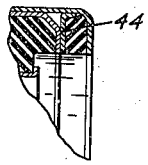
Figure 4 is a modification of the invention illustrated in Figures 1 through 3, which will allow the plug to rotate with respect to the vacuum cleaner as well as with respect to the conduit or hose.

In the modification illustrated in Figure 4 a tubular bearing 44 is disposed in the receptacle or socket of the vacuum cleaner in abutting relation with a resilient washer. This bearing 44 is yieldably urged against the entrance end of the ferrule of the lug so as to provide a good seal and at the same time allow the plug to rotate in the receptacle as well as with respect to the conduit or hose 4. In this arrangement when the plug rotates the shoulder portions of the latches will slide against the inner side of the end wall 2 of the vacuum cleaner. Accordingly, it is evident that this construction provides auxiliary means to prevent twisting and kinking of the hose or conduit when the tool or accessory attached to the opposite end of the conduit is being used.

Figure 5:
Figure 5 illustrates another modification of the invention whereby the plug or fitting may rotate with respect to the housing including the conduit or hose.
Figure 2:
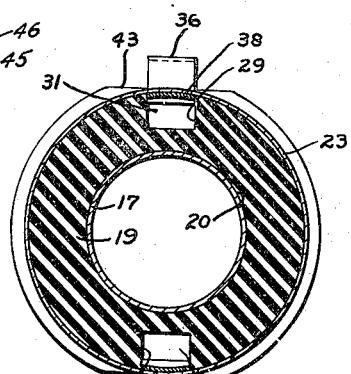
Figure 2 is a transverse section taken through an appropriate part of the coupling for the purpose of showing additional details of construction.
Figure 3:
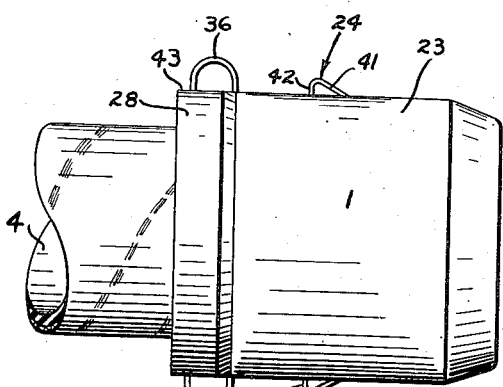
Figure 3 is a side view of the coupling.

In the modification illustrated in Figure 5 the washer 15 is omitted so that the end wall of a ferrule 45 forming a part of a plug is adapted to bear against the bottom wall of a receptacle or socket 46 to thereby allow the plug or fitting to rotate in the receptacle as well as with respect to the conduit or hose 4.

In view of the foregoing it will be evident that to connect the plug to the cleaner it is merely necessary to grasp either the conduit or plug or both and force the plug into the opening 5 of the cleaner, to cause the cam portions 41 of the catches to be moved inwardly as indicated by the dotted lines in Figure 1, and when the entrance end of the plug engages and compresses the washer 15, seated in the receptacle 7, the catch portions will snap outwardly into the space formed by the annular portion 10 of the receptacle so that the shoulder portions 42 will abut the inner side or surface of the end wall of the cleaner whereby to detachably hold the plug in place. So held the conduit and tube 17 are free to rotate with respect to the plug and prevent kinking of the conduit. To release the plug it is merely necessary to depress the finger portions 36 of the latches so that the shoulder portions 42 of the latches disengage the inner side of the end wall of the housing and then pull the plug. The washer 15 not only serves as a seal but tends to more or less throw the plug outwardly when the plug is being disconnected. The exposed handle portion 28 of the plug is preferably flattened at 43 in order to facilitate operating the latches.

It will also be manifest that since the latches are resilient and are spring pressed the latches are sensitive but very positive in action, and accordingly provide a quick detachable connection between the conduit fitting and the vacuum cleaner. Moreover, it will be apparent that if found desirable the washer 15 may be constructed of some desirable material which will allow the plug to rotate in the receptacle 7 as well as with respect to the conduit 4; or the washer may be eliminated entirely in which event the entrance end of the plug would bear against the end wall of the receptacle to allow the plug to rotate in the receptacle as exemplified in Figure 5 of the drawing.

Having thus described my invention, it is obvious that various other modifications may be made in the same without departing from the spirit of the invention; and, therefore, I do not wish to be understood as limiting myself to the exact forms, constructions, arrangements, and combinations of parts herein shown and described.

I claim:

1. In a device of the kind described, a conduit, a tube having one extremity anchored in said conduit and its other extremity extending free beyond the end of said conduit, a stop provided adjacent the free end of said tube, a body rotatably mounted on said tube, said body being provided with a recess at one extremity receiving the end of the conduit and a recess at its other extremity receiving the stop of the tube whereby to hold said body against axial movement with respect to said tube, a ferrule surrounding said body in a manner whereby the space between said tube and said ferrule is substantially taken up by said body, said body being provided with an exposed handle portion and a channel one end of which terminates adjacent said handle portion, an aperture provided in said ferrule, latch means disposed in said channel having a catch projecting through said aperture and a finger portion projecting outwardly through said handle portion for depressing said catch, and resilient means acting on said latch means for normally urging said catch portion outwardly from said channel.

2. In a device of the kind described, a conduit, a body rotatably mounted with respect to said conduit, a ferrule surrounding at least a part of said body and provided with an aperture, and latch means carried by said body projecting through said aperture in a manner whereby said ferrule is detachably connected to said body.

3. In a device of the kind described, a conduit, a tube having one extremity secured to said conduit and its other extremity extending beyond the end of the conduit, said last mentioned extremity of said tube being provided with a stop, a non-metallic body rotatably mounted on said tube in a manner whereby said stop and said conduit prevent axial movement of said body, a ferrule surrounding at least a part of said body, said ferrule being provided with an aperture and a portion engaging one extremity of said body for limiting axial movement of said ferrule on said body in one direction, and latch means carried by said device having a portion projecting through the aperture of said ferrule for holding said ferrule against movement in an opposite axial direction.

4. A plug device adapted to be connected to a conduit; said plug device including an elongated tube, one end of which is adapted to be fitted into the end of the conduit with its other end extending free beyond the end of the conduit; said tube being provided with a projection adjacent its free end; a non-metallic body rotatably mounted on said tube with a portion thereof adapted to engage said projection for holding the body against movement in one axial direction, a band surrounding at least a part of said body, an aperture provided in said band, a recess provided in said body, latch means disposed in said recess having a catch portion projecting through said aperture and another portion projecting through a portion of the body clear of the band providing means for depressing said catch portion, said catch portion functioning to hold said band assembled with said body.

5. A plug device adapted to be connected to the end of a conduit, said plug device including a tubular part, a body part rotatably mounted on said tubular part, a band carried by said body part, and latch means carried by said body part cooperating with said band for detachably holding said band to said body.

6. A plug device adapted for connection with a conduit, said plug device including a body part adapted to be rotatably mounted with respect to the conduit, said body part being provided with a pocket, latch means mounted in said pocket, a band surrounding at least a part of said body cooperating with said latch means in a manner whereby to hold said latch means substantially in said pocket and said band with respect to said body.

7. A plug device adapted to be connected to a conduit, said plug device including a pair of tubular members, latch means detachably connecting said tubular members together, and a tube having one extremity for connection to the conduit and its other extremity adapted to extend beyond the end of the conduit to provide a bearing for rotatably mounting said pair of tubular members and holding said tubular members against axial movement in one direction with respect to said tube.

8. In a device of the kind described, a conduit, a body rotatably mounted with respect to said conduit, said body being provided with a pair of generally cylindrical portions, one of said portions being adapted for reception in a socket, the other of said portions forming a handle, latch means carried by the body, said latch means having a portion adapted to hold the device connected to the receptacle, and another portion projecting through the handle portion for operating the holding portion.

9. A plug device adapted to be connected to the end of a conduit, said plug device including a tubular part, a one piece body part mounted on said tubular part, said body part including a pair of portions one of which is larger in cross-section than the other, and latch means carried by the body having a holding portion projecting outwardly from the smaller portion for engagement with an abutment and a portion seated in and projecting from the larger portion for operating the holding portion.

10. A coupling comprising, a vacuum cleaner housing part provided with an opening, a receptacle, secured to one side of said part in substantial axial alignment with said opening, a plug device secured to a conduit disposed in said opening, sealing means disposed between said plug device and said receptacle, and means providing a seal between said part and said receptacle whereby to prevent the seepage of air therebetween or into the receptacle through said opening, and means for holding said plug device in said receptacle in such a manner that a portion of said plug device is adapted to bear against said sealing means to prevent the seepage of air between said plug device and said receptacle.

11. A plug device adapted to be connected to a conduit, said plug device including a pair of tubular members, interlocking means providing the sole means for detachably connecting said tubular members together, and a tube adapted to be connected to a conduit providing a bearing for said members and means for holding them against axial movement in one direction with respect to the tube.

12. In a device of the kind described, a conduit, a tube having one extremity anchored in said conduit and its other extremity free beyond the end of said conduit, a flange provided adjacent the free end of said tube, a non-metallic body rotatably mounted on said tube, said body being provided with a recess at one extremity receiving the end of the conduit and a recess at its other extremity receiving the flange of the tube whereby to hold said body against axial movement with respect to said tube, a ferrule surrounding said body in a manner whereby the space between said tube and said ferrule is completely taken up by said body, said body being provided with an exposed handle portion and a channel one end of which terminates in said handle portion, an aperture provided in said ferrule, latch means disposed in said channel having a catch projecting through said aperture and a finger portion projecting outwardly through said handle portion for depressing said catch, and resilient means acting on said latch means for normally urging said catch portion outwardly from said channel.

13. A coupling device comprising, a mounting provided with an opening, a receptacle secured to one side of said mounting, a seal disposed between said receptacle and said one side of said mounting, a sealing means disposed in said receptacle, a plug device carried by the end of a conduit disposed in said opening with one end of said device bearing against said sealing means, and means cooperating with said mounting for detachably holding said plug device in place.

14. A coupling comprising, a vacuum cleaner housing part provided with an opening, a receptacle secured to one side of said part in substantial axial alignment with said opening, a plug device secured to a conduit disposed in said opening, and resilient sealing means disposed between said plug device and said receptacle.

15. A plug device comprising, a tubular one piece body of non-metallic material adapted for entry into the opening of a mounting, said body including a pair of portions one of which is larger in cross-section than the other, and latch means having a holding portion projecting outwardly with respect to the smaller portion for securing the device in the opening and a hand operated portion projecting and movable transversely with respect to the longitudinal axis of the larger portion for operating the holding portion.

16. In a device of the kind described, a one piece non-metallic body provided with a handle portion provided with an opening, a pocket provided in said body intersecting said opening, and latch means disposed for pivotal movement in said pocket having a holding portion adapted to cooperate with a mounting and a laterally movable portion in the opening for operating the holding portion.

17. A plug device comprising, a conduit, a cylindrical member secured to said conduit, a one piece body mounted on said member and having a portion overlying a portion of said conduit, said body having a portion adapted to enter the opening of a mounting and a larger portion constituting a handle, an opening in said handle portion, and latch means having a holding portion projecting outwardly from the entering portion to engage the mounting for securing the device thereto and an integral portion movable transversely in the opening provided in said handle portion for operating the holding portion.

EARL J. BAUMGARDNER.

REFERENCES CITED

The following references are of record in the file of this patent:

UNITED STATES PATENTS

| Number | Name | Date |
| --- | --- | --- |
| 1,622,216 | Anlauf | Mar. 22, 1927 |
| 2,994,967 | Williams | June 18, 1935 |
| 2,102,802 | Lofgren | Dec. 21, 1937 |
| 2,150,765 | Forsberg | Mar. 14, 1939 |
| 2,210,826 | Williams | Aug. 6, 1940 |